UNITED STATES PATENT OFFICE.

SIEGFRIED GIRONCOLI, OF ZOLLFELD, AUSTRIA-HUNGARY.

PRESERVING OF RAW VICTUALS OF ANIMAL ORIGIN.

1,017,144.     Specification of Letters Patent.     Patented Feb. 13, 1912.

No Drawing.     Application filed March 24, 1908. Serial No. 423,000.

*To all whom it may concern:*

Be it known that I, SIEGFRIED GIRONCOLI, a subject of the Emperor of Austria-Hungary, residing at Zollfeld, in the Province of Carinthia and Empire of Austria-Hungary, have invented new and useful Improvements in Processes of Preserving Raw Victuals of Animal Origin, of which the following is a specification.

This invention has for its object to preserve raw victuals of animal origin, such as raw meat, venison, poultry, fish, crustaceous animals, eggs and the like during several months in unaltered state.

According to the invention, the pieces of raw material to be preserved are first provided with a complete, uninterrupted coating of solid fatty substances, and afterward they are inclosed in an air-tight chamber, which is filled with a suitable gas at a pressure of from 2 to 5 atmospheres. The gases which may be employed for this purpose, are required not to combine with the raw victuals and not to impart to them any taste or smell. Gases suitable for this use are, among others, dioxid of carbon ($CO_2$), sterilized air, nitrogen (N), oxygen (O), hydrogen (H), protoxid of nitrogen ($N_2O$), nitric oxid (NO), methane ($CH_4$) and othane ($C_2H_6$).

The fat to be applied may be of vegetable or animal origin. In order to increase the adhesion of the fat to the bodies to be preserved, it is advantageous to emulsify the fat with a thick solution of sugar; a concentrated extract of red beet well answers this purpose. By emulsifying liquid fats with a solution of sugar, a material capable of solidifying is formed, and furthermore the emulsion can be washed off from meat with water.

The coating of solid fat or emulsion is best applied by means of a coarse brush, which serves for spreading over the bodies the naturally liquid or molten mass.

The victuals to be preserved remain in the air tight chamber, enveloped by the gas under pressure up to the moment of their being cooked for consumption. Every time a piece of meat or other victual is to be taken out of the chamber, the gas under pressure is first to escape, thereupon the chamber is opened, the piece of meat removed, the chamber closed again, and gas under pressure caused to flow into it again.

What I do claim, and desire to secure by Letters Patent is:

1. A process of preserving raw victuals of animal origin, the said process consisting in first coating the articles to be preserved with a solid fatty substance, afterward inclosing them in an air-tight chamber, filling this chamber with a suitable gas under a pressure of from 2 to 5 atmospheres, and keeping up this pressure up to the moment of the victuals being cooked, the gas being not poisonous and of such a nature as not to attack the article and not to impart to them any taste or smell, substantially as and for the purpose described.

2. A process of preserving raw victuals of animal origin, the said process consisting in first coating the articles to be preserved with an emulsion of fat and solution of sugar, afterward inclosing the coated articles in an air-tight chamber, filling this chamber with a suitable gas under a pressure of from 2 to 5 atmospheres, and keeping up this pressure up to the moment of the victuals being cooked, the gas being not poisonous and of such a nature as not to attack the articles and not to impart to them any taste or smell, substantially as and for the purpose described.

3. A process of preserving raw victuals of animal origin, the said process consisting in first coating the articles to be preserved with an emulsion of fat and extract of red beet, afterward inclosing the coated articles in an air-tight chamber, filling this chamber with a suitable gas under a pressure of from 2 to 5 atmospheres, and keeping up this pressure up to the moment of the victuals being cooked, the gas being not poisonous and of such a nature as not to attack the articles and not to impart to them any taste or smell, substantially as and for the purpose described.

In witness whereof I have signed this specification in presence of two witnesses.

SIEGFRIED GIRONCOLI.

Witnesses:
VICTOR KREUPL,
ROBERT W. HEINGARTNER.